March 15, 1927.　　　　E. ROUČKA　　　　1,621,280
IMPULSE SYSTEM OF CONTROL
Filed Aug. 20, 1923　　2 Sheets-Sheet 1
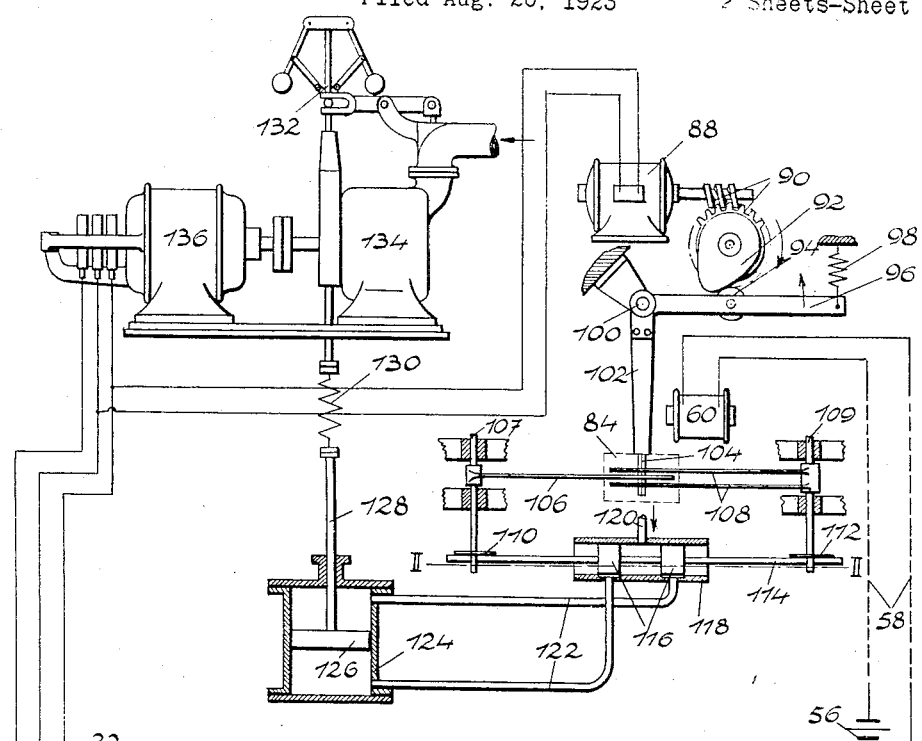
Fig.1
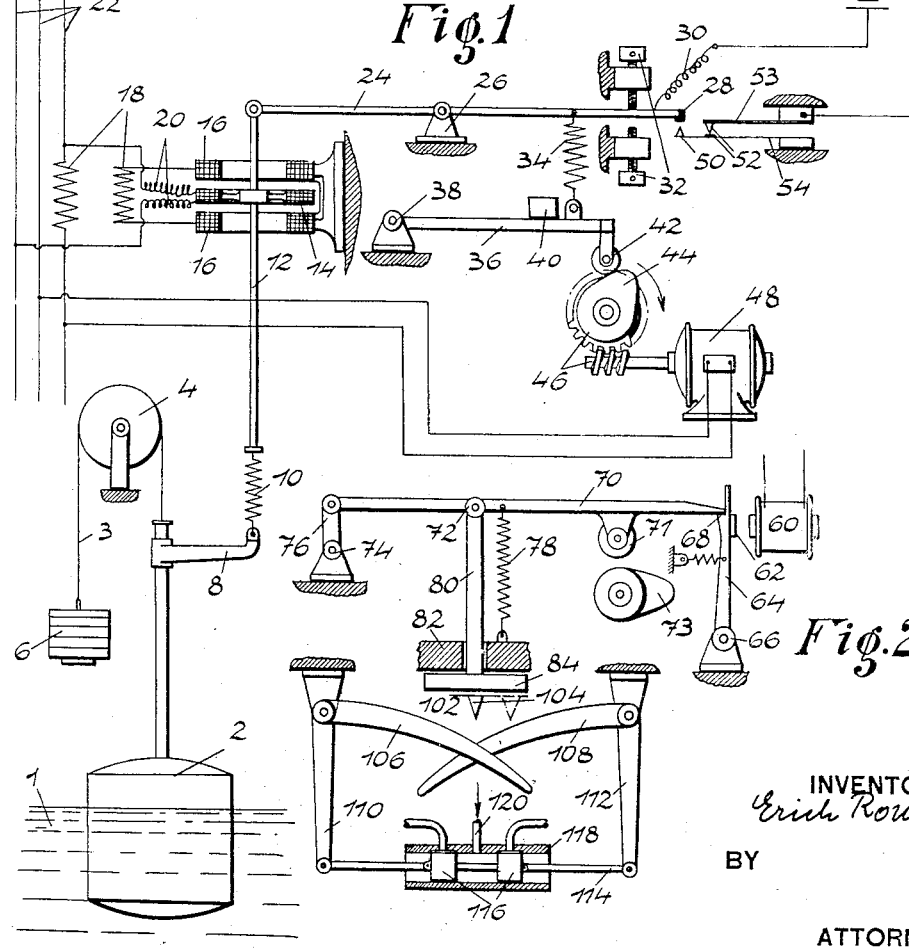
Fig.2
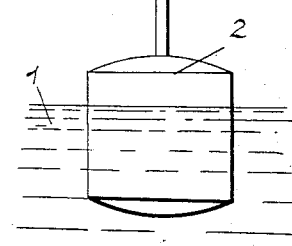
INVENTOR
Erich Roucka
BY
ATTORNEY.

March 15, 1927.
E. ROUČKA
1,621,280
IMPULSE SYSTEM OF CONTROL
Filed Aug. 20, 1923   2 Sheets-Sheet 2
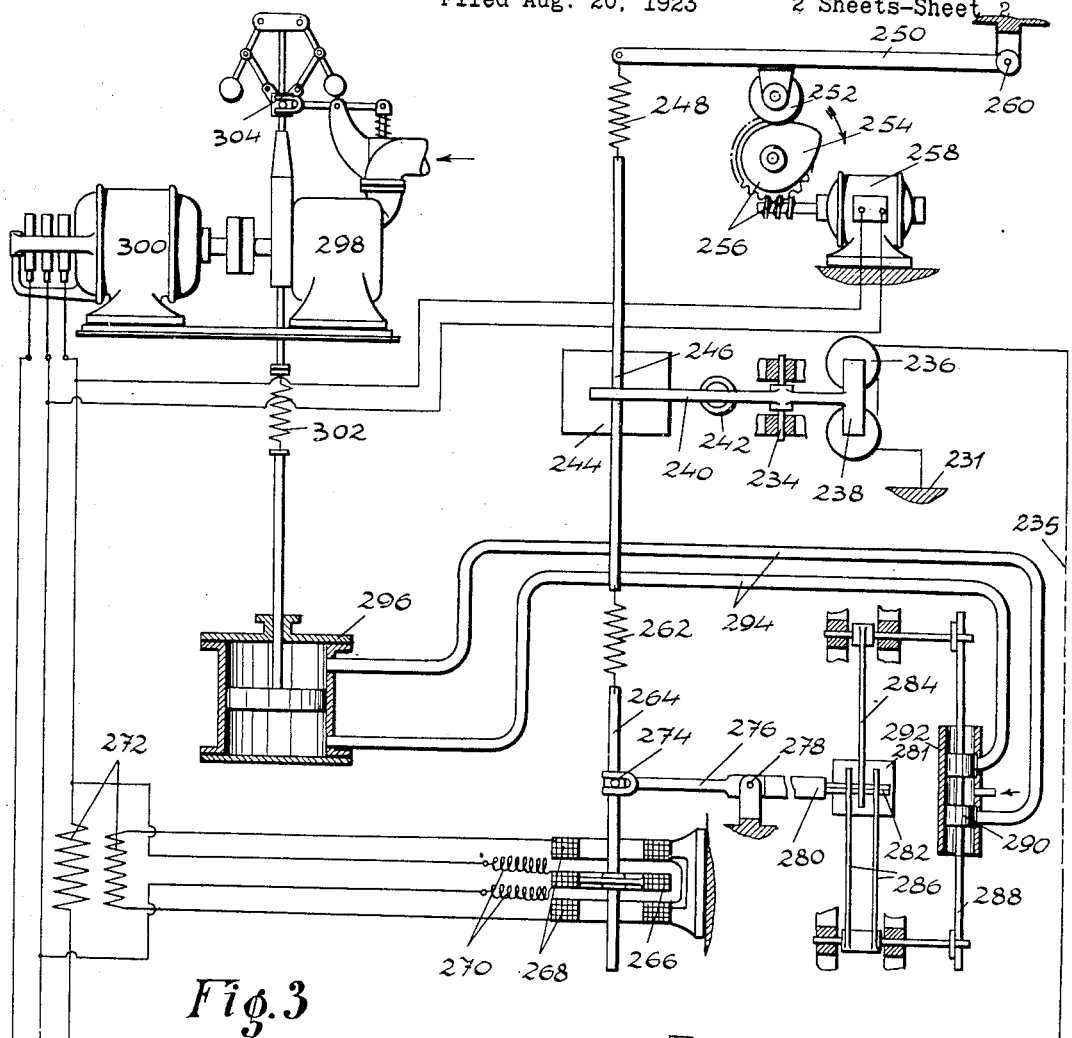
Fig. 3
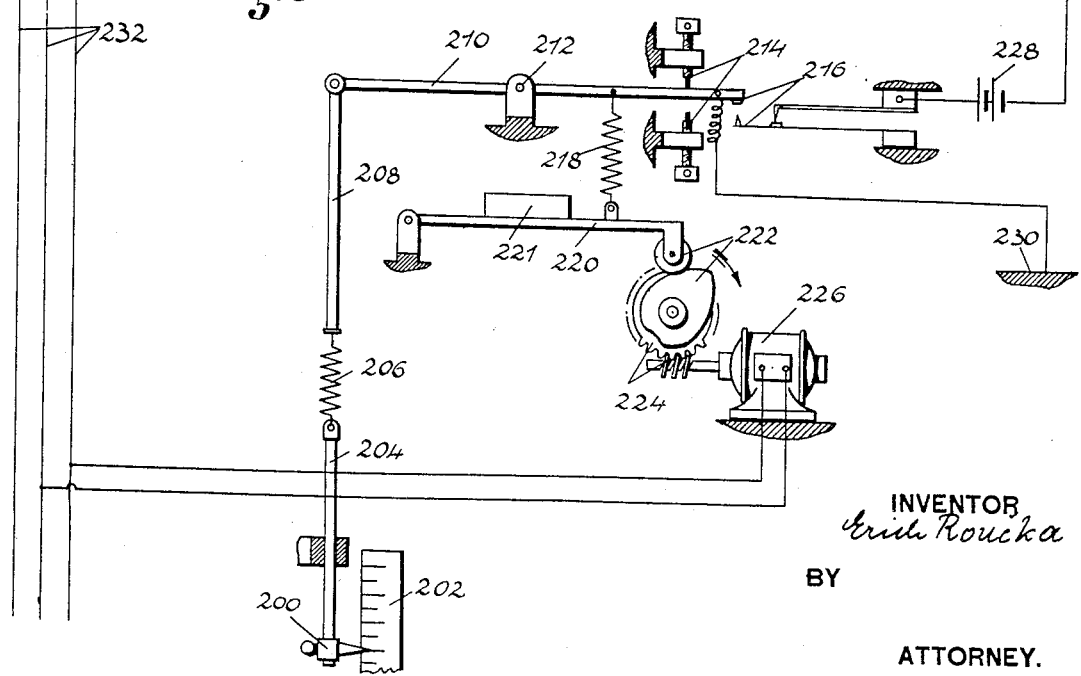
INVENTOR
Erich Roučka
BY
ATTORNEY.

Patented Mar. 15, 1927.

1,621,280

UNITED STATES PATENT OFFICE.

ERICH ROUČKA, OF BLANSKO, CZECHOSLOVAKIA.

IMPULSE SYSTEM OF CONTROL.

Application filed August 20, 1923, Serial No. 658,353, and in Czechoslovakia September 4, 1922.

This invention consists in general in the provision of a system for controlling any value, such as a quantity or condition, through sudden changes or impulses of auxiliary energy produced at different time positions in regular intervals of time, said time positions determining the controlling action.

Another object is to provide a system of the character described in which said time positions of said impulses in corresponding intervals of time determine the direction, positive or negative, and the extent of the controlling action.

A further object is to provide such a system including a plurality of synchronously actuated mechanisms operating in cycles of regular intervals of time, means cooperating with one of said mechanisms for producing impulses of an auxiliary energy at different time positions in said intervals of time, a governing mechanism for producing the controlling action, and means actuated by cooperation of the other of said synchronously operated mechanisms and means actuated by said impulses to actuate said governing mechanism in accordance with the said time positions of said impulses.

Another object is to provide a system of this character by means of which any value may be controlled in accordance with another variable value.

Other objects are to provide such a system for controlling electric input or output of electrical apparatus in accordance with another variable condition; to provide a system of the character described including a fluid motor and fluid governor therefor for producing the controlling action, said governor being actuated in accordance with the time positions of the impulses of auxiliary energy; to provide such a system embodying a novel construction and arrangement of apparatus, and to obtain other results and advantages as may be brought out by the following description.

Referring to the accompanying drawings in which the same reference characters designate corresponding and like parts, Figure 1 is a diagrammatic illustration of a system embodying my invention for controlling the output of an alternating electric current generator in accordance with variations in the level of a liquid;

Figure 2 is a diagrammatic side elevation of the governor mechanism for regulating the controlling action, taken on the line II—II of Figure 1, and Figure 3 is a diagrammatic illustration of another system embodying my invention in which the value being controlled is manually regulated.

In the specific embodiment of the invention shown in Figures 1 and 2, the value to be controlled is the output of an alternating electric current generator 136 driven by a turbine 134 the flow of a motive fluid to which is controlled by a valve governor 132. The said output of the generator 136 is adapted to be controlled in accordance with variations in the level of a liquid 1. Means sensitive to the electricity output of the generator 136 cooperates with means sensitive to the variations in the level of the liquid 1 to control production of impulses of auxiliary electric energy at different time positions in regular intervals of time in accordance with variations in the level of the liquid, and a governor mechanism for controlling the flow of fluid to the turbine 134 is actuated in accordance with the said time positions of said impulses of auxiliary energy.

The apparatus for producing these results may comprise a float 2 partially submerged in the liquid 1 and connected to one end of a flexible connector 3 passing over a roller 4 mounted on a fixed support, the other end of said connector 3 carrying a counterweight 6 which balances the float 2. The said float is provided with an arm 8 connected by a tension spring 10 to a rod 12 carried by a movable coil 14 of a dynamometer mounted between fixed coils 16. The said movable coil is connected to the net 22 at the output side of the generator 136, and the fixed coils 16 are connected through a transformer 18 in series with the generator 136. With this construction, when the force of the spring 10 which is controlled by the level of the liquid 1 is equal to the force influencing the movable coil 14, a condition of equilibrium is established between the apparatus actuated by the controlling value which is the level of the liquid 1, and the apparatus actuated by the controlled value which is the output of the generator 136.

When either the level of the liquid 1 or the output of the generator 136 varies, the equilibrium of the system is disturbed and the movable coil 14 is actuated, and in accordance with the invention the dynamometer 14, 16 cooperates with the float 2 and spring 10 during regular intervals of time to produce impulses of auxiliary energy which will be at different time positions in corresponding intervals in accordance with the variations between the level of the liquid 1 and the output of the generator 136. The duration of said regular intervals of time is determined by rotation of a cam 44 driven through worm and worm wheel gearing 46 from a synchronous motor 48 which is connected to the net 22 of the generator 136. A lever 36 is pivotally connected at one end to a fixed support as at 38 and carries at its other end a roller 42 which follows the periphery of the cam 44, and said lever 36 is connected by a tension spring 34 to one end of a lever 24 pivotally mounted intermediate its ends to a fixed support as at 26 with its other end pivotally connected to the rod 12 of the movable coil 14. A weight 40 is also mounted on the lever 36 to cooperate with the spring 34 for a purpose hereinafter described. The end of the lever 24 connected to the lever 36 carries a metallic electric contact 28 adapted to cooperate with a contact 50 carried by a spring strip 54, and said spring strip carries a second contact adapted to cooperate with another spring strip 53, as indicated at 52. The spring strip 53 is connected in circuit with a source of auxiliary electric energy 56, and the lever 24 is also connected in circuit with said source. The lever 36 is constantly oscillated in cycles of regular intervals of time determined by rotation of the cam 44, and the tension of the spring 34 is thereby regularly varied so that at some point in each of said cycles the lever 24 will be moved to close contacts 28, 50 to produce an impulse of energy from the source 56. When equilibrium obtains in the system said impulse will be produced at the same point in each cycle or the same time position in the corresponding intervals of time, but upon a variation of the electricity output of the generator 136 or of the level of the liquid 1, this time position will be changed due to variation in the tension of the spring 10. The movement of said lever 24 is limited by fixed stops 32 and the duration of said impulse is determined by the time required for the lever 24 to break the contact 52. In accordance with the invention the time position of an impulse when the system is in equilibrium is predetermined to take place at the middle of the corresponding interval of time, and this time position is adjusted by means of the weight 40 cooperating with the spring 34.

The said impulses are transmitted by wires 58 to a governing mechanism for the supply of fluid to the turbine 134 including means actuated by said impulses which cooperates with means operated synchronously with the cam 44 to actuate the governor mechanism in accordance with the time positions of said impulses. The wires 58 are shown as connected to an electromagnet 60 which cooperates with an armature 62 carried by a lever 64 pivotally mounted at one end on a fixed support as at 66. Said armature lever 64 is provided with a detent lug 68 to engage the swinging end of a lever 70 pivotally mounted at its other end through a link 76 to a fixed support as at 74. Said lever 70 has pivotally connected thereto intermediate its ends a rod 80 carrying a hammer head 84, and a spring 78 is connected between said lever and a fixed support 82 to actuate said hammer head in one direction when the lever 70 is released by the detent lug 68. Upon the production of each impulse of auxiliary energy the electromagnet 60 is energized, attracts the armature 62 to move the lug 68 from beneath the lever 70 and thereby permits said lever to be actuated by the spring 78 to move the hammer head 84. The lever 70 is returned to its normal position in engagement with the lug 68 by means of a cam 73 operated synchronously with the cam 44 by means of a synchronous electric motor 88 connected to the net of the generator 136.

A bell crank lever 96 is pivotally connected intermediate its ends to a fixed support as at 100 and carries on one of its arms a follower roller 94 riding on the periphery of a cam 92 driven through worm and worm wheel gearing 90 from the said motor 88. The roller 94 is maintained in engagement with the cam 92 by a tension spring 98. The other arm of the bell crank lever carries a resilient strip 102 provided at its end with a rigid head 104 which is oscillated by rotation of the cam 92 back and forth beneath the hammer 84. Thus, the oscillations of the head 104 are in regular cycles synchronous with the time intervals determined by the cams 44 and 92.

Arranged beneath the head 104 are two systems of levers 106 and 108 having their adjacent ends overlapping and pivotally connected at their other ends to fixed supports as at 107 and 109, respectively. The said levers 106 and 108 have rigidly connected thereto the corresponding arms 110 and 112 which are in turn connected by links 114 to opposite ends of the fluid governor valve 116 reciprocable within a cylinder 118 to control the flow of fluid from a fluid supply pipe 120 to and from pipes 122 connected to a fluid pilot motor 124 at opposite sides of a piston 126. The piston 126 carries a piston rod 128 connected by a spring 130 to the valve governor 132.

When the system is in condition of equilibrium the impulse of auxiliary energy takes place at the middle of the corresponding interval of time so that when the electromagnet 60 is energized and the hammer 84 is actuated the head 104 of the bell crank lever 96 is disposed substantially equidistantly from the ends of the levers 106 and 108 as shown in Figure 2, said position corresponding to the middle of the interval of time. As the hammer head 84 descends the head 104 of the bell crank lever is forced into engagement with the levers 106 and 108 and exerts even forces on opposite ends of the governor valve piston 116 so that said piston remains in its neutral position to prevent the flow of fluid to or from the fluid motor 124. When the equilibrium of the system is disturbed, the impulse of auxiliary energy is produced by the contacts 28 and 50 at a time position at one side or the other of the middle of the time interval, so that when the magnet 60 is energized and the hammer head 84 is actuated, the head 104 of the bell crank lever is disposed at one side or the other of its neutral position, as indicated by dotted lines in Figure 2, this position of the head 104 corresponding to the time position of the impulse in the corresponding interval. Thus, the head 104 is actuated into engagement with one of the levers 106 and 108 before engagement with the other thereof so that the piston 116 is moved in one direction or the other and permits flow of fluid from the pipe 120 to one side of the piston 126 of the fluid motor and from the other side thereof through the pipes 122. The piston 126 is thus actuated in one direction and exerts or releases tension on the spring 130, whereby the valve governor 132 is regulated in one direction or the other to increase or decrease the supply of fluid to the turbine 134. The speed of revolution of the turbine is thus varied and in turn varies the output of the generator 136. This controlling action continues until equilibrium between the influences of output of the generator on the coils 14, 16 and of the level of the liquid 1 on the float 2, is again established, whereupon all of the parts of the impulse producing and governing mechanisms return to their normal neutral positions.

It will be observed that the controlling of the output of the generator 136 through the turbine 134 is in accordance with the time positions of the impulses of auxiliary energy in corresponding intervals of time, and that said time positions of the impulses are varied in accordance with variations in the electricity output or level of the liquid. It will also be observed that the time positions of the said impulses determine both the direction, positive or negative, and the extent of the controlling action. That is, when the impulse is produced at one side of the middle of the interval the controlling action is such as to increase the output of the generator 136, while when the impulse takes place at the other side of the middle of the time interval the output of the generator is decreased.

In Figure 3 of the drawings a system is illustrated in which the time positions of the impulses of auxiliary energy are manually varied instead of in accordance with variations in a variable value, as the liquid level in Figure 1. For the purpose of illustration, the value to be controlled is the output of an alternating current generator 300 driven by a turbine 298 the supply of fluid to which is controlled by the valve governor 304, the construction and operation being identical with that shown in Figure 1.

The time positions of the impulses are determined by the position of a pointer 200 on a scale 202, and the position of said pointer is manually regulated by reciprocation of a rod 204 carrying the pointer. Said rod is connected by a tension spring 206 to a link 208 pivotally connected to one end of a lever 210 which is pivotally connected intermediate its ends to a fixed support as at 212. The opposite end of said lever carries a contact adapted to cooperate with a contact on a switch mechanism as indicated at 216, said switch mechanism being identical in construction and operation with the switch mechanism 50, 54, shown in Figure 1. The switch mechanism is connected to one terminal of a source 228 of auxiliary electric energy the other terminal of which is connected to the governor mechanism hereinafter described, and the lever 210 is connected to the ground as at 230. The time interval during which an impulse is produced is determined by cam and lever mechanism 220, 222 driven through gearing 224 from a synchronous motor 226 connected to the net 232 of the generator 300, the lever 220 being connected by a spring 218 to the lever 210 and carrying a weight 221 corresponding to the weight 40 of the construction shown in Figure 1. The mechanism 220 to 226 is identical in construction and operation with the mechanism 36 to 48, shown in Figure 1, and the impulse of auxiliary energy is produced by oscillation of the lever 210 into engagement with the contact 216, said oscillation being controlled by variations in the tension of the spring 206 by movement of the rod 204. The impulses of auxiliary energy are transmitted by a wire 235 to means adapted to be actuated by said impulses and cooperating with other means for governing the controlling action for varying the output of the generator 300. The controlling action, that is, the varying of the supply of fluid to the generator 298, is accomplished by a fluid motor 296 connected by a tension spring 302 to the valve governor 304, substantially as shown in the construction of Figure 1.

The governing mechanism includes a dynamometer consisting of a movable coil 266 connected by flexible connections 270 to the net 232 of the generator 300 and arranged between two fixed coils 268 connected in series with the generator 300 through a transformer 272. The movable coil 266 carries a rod 264 which is connected by a tension spring to a link 246 which is in turn connected by a tension spring 248 to one end of a lever 250 pivotally connected at its other end to a fixed support as at 260. The lever 250 carries a roller 252 adapted to follow the periphery of a cam 254 driven through worm and worm wheel gearing 256 by a synchronous motor 258 connected to the net of the generator 300. The lever 250 is accordingly oscillated synchronously with the rotation of the cam 222 and regularly varies the tension of the spring 248. The current from the generator 300 through the dynamometer 266, 268 tends to balance the tension of the spring 262. The link 246 except during an impulse of auxiliary energy, is held against longitudinal movement by means of a lever 240 actuated by a spring 242 which clamps the link 246 between said lever and a fixed block 244. The lever 240 is pivotally connected intermediate its ends to a fixed support as at 234 and carries at its other end an armature 238 cooperating with electromagnets 236 which are connected in circuit with the source of auxiliary energy 228 and the ground as at 231. With this construction it will be observed that upon each impulse of auxiliary energy the magnets 236 will be energized and oscillate the lever 240 against the action of the spring 242 to release the link 246. The said link will thus be moved longitudinally by the tension of the spring 248 until the tension of said spring and the spring 262 are balanced. This action of the link 246 produces a movement of the movable coil 266 of the dynamometer whereby equilibrium in the system is disturbed. This action takes place in accordance with the time position of the impulse in an interval of time determined by the rotation of the cams 254 and 222, and in accordance with the invention governing mechanism for the motor 296 is actuated simultaneously with the impulse and upon disturbance of the equilibrium produced by release of the link 246.

Said governing mechanism may be substantially identical in construction with that shown in Figures 1 and 2 and includes a governor valve piston 290 mounted in a cylinder 292 and adapted to control the flow of fluid to and from the motor 296 through pipes 294. The valve piston 290 is actuated by cooperation of links 284 and 286 corresponding to the links 106 and 108 with a rigid head 282 carried by the flexible member 280 forming a part of a lever 276 pivotally connected intermediate its ends to a fixed support as at 278 and having a pin and slot connection 274 at its end opposite the head 282 with the rod 264 of the movable coil 266.

When the pointer 200 is in a position so that the tension of the spring 206 is in equilibrium with the influence of the output of the generator 300 on the coils 266, 268, the impulse of auxiliary energy will be produced at the middle of the interval of time and the head 282 of the lever 276 will be in its neutral position equidistant from the ends of the levers 284 and 286. When the output of the generator is desired to be changed and the equilibrium of the system is disturbed by movement of the pointer 200, the impulse takes place at one side or the other of the middle of the interval, and upon release of the link 246 by the lever 240 the lever 276 is oscillated to move the head 282 in one direction or the other. The said head is periodically actuated into engagement with the levers 284 and 286 by means of a block 281 periodically reciprocable by any suitable source of power, and when said block 281 moves the head 282 toward said levers, said head engages one of the levers in advance of the other, whereby the valve piston 290 is moved in one direction. The flow of fluid through the pipes 294 is thus varied and produces a motion of the piston of the fluid motor 296 to vary the tension of the spring 302 and regulate the valve governor 304 so that the supply of fluid to the turbine 298 is increased or decreased. The output of the generator 300 is correspondingly increased or decreased and the controlling action continues until equilibrium is again established between the influence of output of the generator on the coils 266, 268 and the tension of the spring 206. The parts of the impulse producing and governor mechanism then return to their normal neutral positions.

It will be observed that the position of the head 282 of the lever 276 is a function of the position of the governor valve piston 290, and as in the construction shown in Figures 1 and 2, the output of the generator 300 is varied in accordance with the time positions of the impulses of auxiliary energy in corresponding intervals of time, said time positions being determined by the tension of the spring 206 varied by the movement of the pointer 200 and cooperating with the spring 218. The position of the governor valve piston 290 is also a function of the direction and extent of the controlling action. Further, the positions of the impulses of auxiliary energy at opposite sides of the predetermined middle of the corresponding time intervals determines the direction of control, and the time distance of said impulses from said predetermined middle part of the intervals determines the extent of the control.

Should it be desired to maintain the output of the generator constant, the operation of the impulse producing mechanism may be stopped so that no impulses to actuate the magnets 236 are produced.

Obviously, the input of electric energy to an apparatus supplied by the generator 300 is also varied, and furthermore the input of energy, that is, the supply of motive fluid, to the turbine 298 is varied in accordance with the time positions of the impulses. It is within the scope of the invention to utilize the same for varying the input or output of other apparatus, and the invention can be so adapted by mere substitution of a mechanism suitable to control the desired value or apparatus in place of the valve governor 304. For instance, the speed of revolution of an electric motor could be varied in accordance with the invention by connecting the governor mechanism to the usual speed controlling rheostat of a motor. Therefore, I do not desire to be understood as limiting myself in the use of the invention except as required by the following claims when construed in the light of the prior art.

Having thus described the invention, what I claim is:

1. A system of control comprising means for producing changes or impulses of auxiliary energy in regular intervals of time, means cooperating with said first-mentioned means to vary the time positions of said impulses in corresponding intervals, a governor mechanism for controlling the value to be controlled, means including a device operated synchronously with said intervals of time, and means actuated by said impulses to cooperate with the last-mentioned means to actuate said governor mechanism in accordance with said time positions of said changes or impulses in corresponding intervals of time.

2. A system of control comprising a plurality of devices synchronously operated in cycles of regular intervals of time, means cooperating with one of said devices to produce impulses of auxiliary energy at different time positions in corresponding ones of said intervals of time, a governor mechanism to control the value to be controlled, means actuated by the other of said synchronous devices, and means actuated by said impulses to cooperate with the last-mentioned means to actuate said governor mechanism in accordance with the time positions of said impulses in corresponding intervals of time.

3. A system of control comprising means for producing changes or impulses of auxiliary energy in regular intervals of time, means cooperating with said first-mentioned means to vary the time positions of said impulses in corresponding intervals, a governor mechanism including a movable part for controlling the value to be controlled, the position of said part determining the direction of control, means including a device operating synchronously with said intervals of time, and means actuated by said impulses to cooperate with said device to vary the position of said movable controlling part in accordance with said time positions of said impulses in corresponding intervals of time.

4. A system of control comprising a plurality of devices synchronously operated in cycles of regular intervals of time, means cooperating with one of said devices to produce impulses of auxiliary energy at different time positions in corresponding ones of said intervals of time, a governor mechanism including a movable part for controlling the value to be controlled, the position of said part determining the direction of control, means actuated by the other of said synchronous devices, and means actuated by said impulses to cooperate with the last-mentioned means to vary the position of said movable controlling part in accordance with the time positions of said impulses in corresponding intervals of time.

5. A system of control comprising means for producing changes or impulses of auxiliary energy in regular intervals of time, means cooperating with said first-mentioned means to vary the time positions of said impulses in corresponding intervals, a governor mechanism including a movable part for controlling the value to be controlled the position of which part determines the direction and extent of the controlling motion, means including a device operating synchronously with said intervals of time, and means actuated by said impulses to cooperate with said device to vary the position of said movable controlling part in accordance with said time positions of said impulses in corresponding intervals of time.

6. A system for remotely controlling a value, comprising a plurality of devices synchronously operated in cycles of regular intervals of time, means cooperating with one of said devices to produce impulses of auxiliary energy at different time positions in corresponding ones of said intervals, a governor mechanism to control said value to be controlled, a system responsive to said value, means actuated by the other of said synchronous devices, and means actuated by said impulses to cooperate with said responsive system and the last-mentioned means to actuate said governor mechanism in accordance with said time positions of said impulses.

7. A system for controlling a value in accordance with variations in another value, comprising means for producing changes or impulses of auxiliary energy during regular intervals of time, a system responsive to said second-mentioned value for cooperating with said impulse producing means for varying the time positions of said impulses in corresponding intervals in accordance with variations in said second-mentioned value, a governor mechanism to control said first-mentioned value, means including a device operated synchronously with said intervals, and means actuated by said impulses to cooperate with the last-mentioned means to actuate said governor mechanism in accordance with said time positions of said impulses in corresponding intervals of time.

8. A system for controlling a value in accordance with variations in another value, comprising means for producing changes or impulses of auxiliary energy during regular intervals of time, a system responsive to said second-mentioned value for cooperating with said impulse producing means for varying the time positions of said impulses in corresponding intervals in accordance with variations in said second-mentioned value, a governor mechanism to control said first-mentioned value, means including a device operated synchronously with said intervals, means actuated by said impulses to cooperate with the last-mentioned means to actuate said governor mechanism in accordance with said time positions of said impulses in corresponding intervals of time, and a system sensitive to variations in said first-mentioned value to cooperate with said impulse producing means to restore the system to equilibrium after the controlling action on said first-mentioned value.

9. A system for controlling a value in accordance with variations in another value, comprising means for producing changes or impulses of auxiliary energy during regular intervals of time, a system responsive to said second-mentioned value, a system sensitive to the value being controlled to cooperate with said first-mentioned system and said impulse producing means to vary the time positions of said impulses in corresponding intervals of time in accordance with variations in either of said values, and means actuated in accordance with said time positions to control said first-mentioned value.

10. A system for controlling a value in accordance with variations in another value, comprising means for producing changes or impulses of auxiliary energy during regular intervals of time, a system responsive to said second-mentioned value for cooperating with said impulse producing means for varying the time positions of said impulses in corresponding intervals in accordance with variations in said second-mentioned value, a motor for controlling said first-mentioned value, a governor for said motor actuated by auxiliary power, means including a device operated synchronously with said intervals, and means actuated by said impulses to cooperate with the last-mentioned means to control actuation of said governor in accordance with the time positions of said impulses.

11. The system set forth in claim 10 with the addition of a system sensitive to variations in said first-mentioned value to cooperate with said impulse producing means to restore the system to equilibrium after the controlling action on said first-mentioned value.

12. A system of control comprising a plurality of simultaneously driven devices, means cooperating with one of said devices to produce sudden changes of auxiliary energy at different time positions in regular intervals of time, an auxiliary energy actuated governor mechanism to control the value to be controlled, means actuated by said impulses of auxiliary energy, and means for actuating said governor mechanism by cooperation of the other of said devices with said means actuated by said sudden changes according to the time position of said sudden changes in corresponding time intervals.

13. A system of control comprising a plurality of devices synchronously operated in cycles of regular intervals of time, means cooperating with one of said devices to produce sudden changes of auxiliary energy at different time positions in said cycles, an auxiliary energy actuated governor mechanism having a movable part adapted to control the value to be controlled and the position of said movable part determining the direction and extent of control, means actuated by said sudden changes of auxiliary energy, and means for varying the position of said movable part by cooperation of the other of said devices and said means actuated by said sudden changes according to the time position of said sudden changes in corresponding time intervals.

14. A system of control comprising a plurality of devices synchronously operated in cycles of regular intervals of time, means cooperating with one of said devices to produce sudden changes of auxiliary energy at different time positions in said cycles, a system sensitive to a value to cooperate with said first-mentioned means to vary the time positions of said impulses in accordance with variations in said value, an auxiliary energy actuated governor mechanism to control the condition to be controlled, means actuated by said sudden changes of auxiliary energy, and means for actuating said governor mechanism by cooperation of the other of said devices and said means actuated by said sudden changes according to the time position of said sudden changes in corresponding time intervals.

15. A system for controlling an electric value, comprising means for producing a controlling action on said value, means for producing impulses of auxiliary energy in regular intervals of time, means cooperating with said first-mentioned means to vary the time positions of said impulses in corresponding intervals, a governor mechanism for controlling the operation of said first-mentioned means, means actuated by said impulses of auxiliary energy, and means including a device operating synchronously with said intervals of time to cooperate with said means actuated by said impulses to actuate said governor mechanism, whereby said first-mentioned means is actuated in accordance with the time positions of said impulses in corresponding intervals of time.

16. A system for remotely controlling an electric value in accordance with variations in another value, comprising means for producing changes or impulses of auxiliary energy during regular intervals of time, a system responsive to said second-mentioned value for cooperating with said impulse producing means for varying the time positions of said impulses in corresponding intervals in accordance with variations in said second-mentioned value, a governor mechanism to control said first-mentioned value, means including a device operated synchronously with said intervals, means actuated by said impulses of auxiliary energy to cooperate with the last-mentioned means to actuate said governor mechanism in accordance with said time positions of said impulses in corresponding intervals of time, and an electric system sensitive to variations in said first-mentioned value to cooperate with said impulse producing means to restore the system to equilibrium after the controlling action on said first-mentioned value.

17. A system for controlling an electric value, comprising means for producing a controlling action on said value, means for producing impulses of auxiliary energy at different time positions in regular intervals of time, a governor mechanism for controlling the operation of said first-mentioned means, means actuated by said impulses of auxiliary energy, and means including a device operating synchronously with said intervals of time to cooperate with said means actuated by said impulses to actuate said governor mechanism, whereby said first-mentioned means is actuated in accordance with the time positions of said impulses in corresponding intervals of time.

18. A system for controlling an electric value, comprising means for producing a controlling action on said value, a plurality of devices operating synchronously in cycles of regular intervals of time, means cooperating with one of said devices for producing impulses of auxiliary energy at different time positions in corresponding ones of said intervals, a governor mechanism to control actuation of said first-mentioned means, means actuated by said impulses of auxiliary energy and means actuated by cooperation of the other of said synchronous devices with said means actuated by said impulses to actuate said governor mechanism, whereby said first-mentioned means is controlled in accordance with the time positions of said impulses.

19. The system set forth in claim 17 with the addition of a system responsive to variations in said electric value to cooperate with said impulse producing means to restore balance in the control system after each controlling action.

20. The system set forth in claim 18 with the addition of a system responsive to variations in said electric value and a system responsive to variations in another value adapted to cooperate with each other and said impulse producing means to vary the time positions of said impulses.

21. A system of control comprising a plurality of simultaneously driven devices, synchronous electric motors for actuating said devices in cycles of regular intervals of time, means cooperating with one of said devices for producing impulses of auxiliary energy at different time positions in said regular intervals of time, a governor mechanism to control the value to be controlled, means actuated by said impulses of auxiliary energy, and means cooperating with the other of said devices and said means actuated by said impulses to actuate said governor mechanism in accordance with the time positions of said impulses.

22. A system of control comprising means for producing impulses of auxiliary energy normally at the same predetermined time position in corresponding regular intervals of time, means cooperating with said impulse producing means for varying said time positions of the impulses so that the time distance of said time positions of said impulses from said normal position determines the extent of control and the location thereof at either side of said predetermined position determines the direction of control, a governor mechanism to control the value to be controlled, means including a device operated synchronously with said time intervals, and means actuated by said impulses to cooperate with the last-mentioned means to actuate said governor mechanism in accordance with said time positions of said impulses.

23. A system of control comprising means for producing impulses of auxiliary energy normally at the same predetermined time position in corresponding regular intervals of time, a system responsive to variations in a value to cooperate with said impulse producing means to vary the time positions of said impulses in corresponding intervals of time so that the time distance of said time positions of said impulses from said normal position determines the extent of control and the location thereof at either side of said predetermined position determines the direction of control, a governor mechanism to control the value to be controlled, means including a device operated synchronously with said time intervals, and means actuated by said impulses to cooperate with the last-mentioned means to actuate said governor mechanism in accordance with said time positions of said impulses.

24. A system of control comprising means for producing impulses of auxiliary energy normally at the same predetermined time position in corresponding regular intervals of time, a system responsive to variations in the value to be controlled and a system responsive to variations in another value to cooperate with each other and said impulse producing means to vary the time positions of said impulses in corresponding intervals of time so that the time distance of said time positions of said impulses from said normal position determines the extent of control and the location thereof at either side of said predetermined position determines the direction of control, a governor mechanism to control the value to be controlled, means including a device operated synchronously with said time intervals, and means actuated by said impulses to cooperate with the last-mentioned means to actuate said governor mechanism in accordance with said time positions of said impulses.

25. A system of control comprising a plurality of simultaneously driven devices, synchronous electric motors for actuating said devices in cycles of regular intervals of time, means cooperating with one of said devices for producing impulses of auxiliary energy normally at the same predetermined time positions in corresponding ones of said regular intervals of time, means cooperating with said impulse producing means to vary the said time positions of the impulses so that the time distance of said time positions of said impulses from said normal position determines the extent of control and the location thereof at either side of said predetermined position determines the direction of control, a governor mechanism to control the value to be controlled, means actuated by said impulses, and means cooperating with the other of said synchronous devices and said means actuated by said impulses to actuate said governor mechanism in accordance with said time positions of said impulses.

26. A system of control comprising a plurality of synchronously operating mechanisms, a source of auxiliary energy, means actuated synchronously with one of said mechanisms in cycles of regular intervals of time to produce an impulse of said auxiliary energy during each of said cycles, means for varying the operation of the last-mentioned means to cause production of impulses of said auxiliary energy at different time positions in corresponding intervals of time, a governor mechanism to control the value to be controlled, means actuated in cycles of regular intervals of time by and synchronously with the other of said mechanisms, and means actuated by said impulses of auxiliary energy to cooperate with the last-mentioned means to control actuation of said governor mechanism.

27. A system of control comprising a plurality of synchronously operating mechanisms, a source of auxiliary energy, means actuated synchronously with one of said mechanisms in cycles of regular intervals of time to produce an impulse of said auxiliary energy during each of said cycles, means for varying the operation of the last-mentioned means to cause production of impulses of said auxiliary energy at different time positions in corresponding intervals of time, a governor mechanism to control the value to be controlled and actuated by auxiliary power, a governor to control actuation of said governor mechanism, means actuated in cycles of regular intervals of time by the other of said synchronous mechanisms, and means actuated by said impulses to cooperate with the last-mentioned means to control actuation of said governor in accordance with the time positions of said impulses.

28. A system of control comprising a plurality of synchronously operating mechanisms, a source of auxiliary energy, means actuated synchronously with one of said mechanisms in cycles of regular intervals of time to produce an impulse of said auxiliary energy during each of said cycles, means for varying the operation of the last-mentioned means to cause production of impulses of said auxiliary energy at different time positions in corresponding intervals of time, a governor mechanism to control the value to be controlled and actuated by auxiliary power, a governor including a plurality of relatively movable parts to control actuation of said governor mechanism, an operative connection between one of said parts and the other of said synchronously operating mechanisms tending to produce relative movement of said parts in cycles of regular intervals of time, and means actuated by said impulses of auxiliary energy to control the influence of said last-mentioned synchronous mechanism upon said governor so that said governor mechanism is actuated in accordance with the time positions of said impulses in corresponding intervals of time.

29. A system of control comprising a plurality of synchronously operating mechanisms, a source of auxiliary energy, means actuated synchronously with one of said mechanisms in cycles of regular intervals of time to produce an impulse of said auxiliary energy during each of said cycles, means for varying the operation of the last-mentioned means to cause production of impulses of said auxiliary energy at different time positions in corresponding intervals of time, a governor mechanism to control the value to be controlled, a system sensitive to the value being controlled, means actuated by cooperation of the other of said synchronous mechanisms and said sensitive system for controlling said governor mechanism, and means actuated by said impulses of auxiliary energy to control cooperation of said last-mentioned synchronous mechanism and said sensitive system to cause actuation of said governor mechanism in accordance with the time positions of said impulses.

ERICH ROUČKA.